May 30, 1933.  S. H. EARL  1,911,442

CUTTER TESTING APPARATUS

Filed March 18, 1929  2 Sheets-Sheet 1

INVENTOR
SCHUYLER H. EARL
BY
ATTORNEY

May 30, 1933.  S. H. EARL  1,911,442
CUTTER TESTING APPARATUS
Filed March 18, 1929  2 Sheets-Sheet 2

INVENTOR
SCHUYLER H. EARL
BY
ATTORNEY

Patented May 30, 1933

1,911,442

UNITED STATES PATENT OFFICE

SCHUYLER H. EARL, OF ROCHESTER, NEW YORK, ASSIGNOR TO GLEASON WORKS, OF ROCHESTER, NEW YORK, A CORPORATION OF NEW YORK

CUTTER TESTING APPARATUS

Application filed March 18, 1929. Serial No. 347,783.

The present invention relates to testing apparatus and particularly to apparatus for testing the diameters of face mill cutters such as are employed in cutting spiral bevel and hypoid gears.

The present invention has for its purpose to provide an improved apparatus for testing face mill cutters for diameter whereby either the inside or outside diameters of such cutters may be tested quickly and accurately and whereby the same apparatus may be employed for testing cutters of different diameters, of different cutter numbers, and of different point widths.

Figure 1:
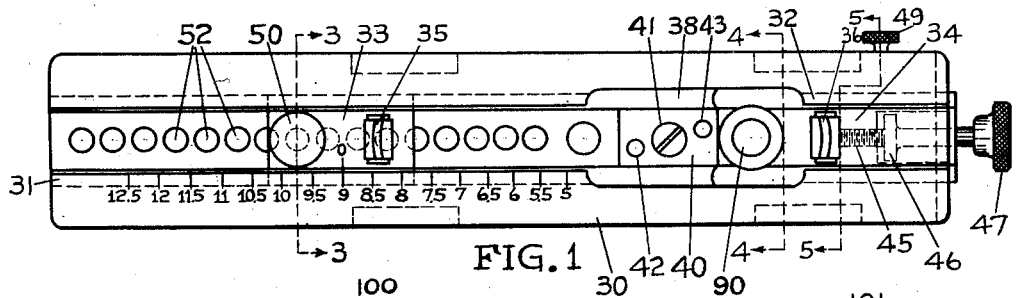
Figure 2:
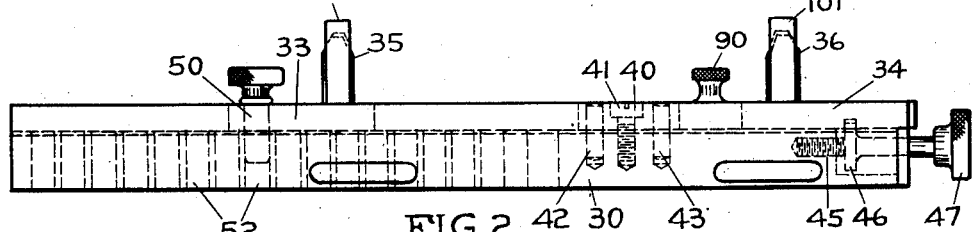
Figure 3:
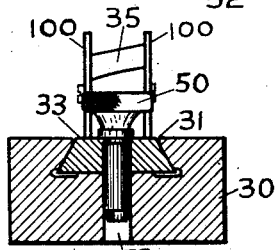
Figure 4:
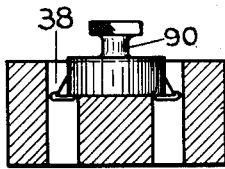
Figure 5:
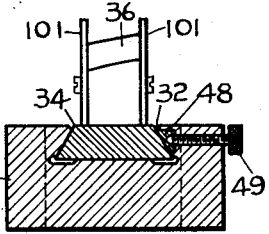
Figure 9:
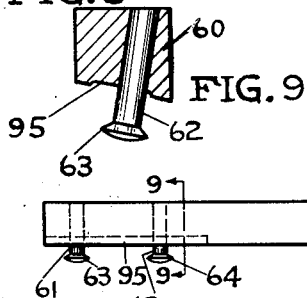
Figure 6:
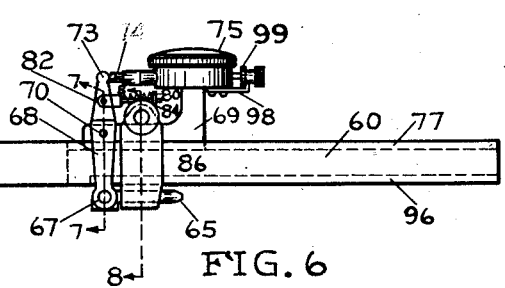
Figures 7, 8:
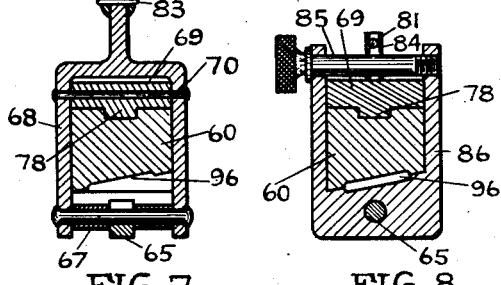
Figure 10:
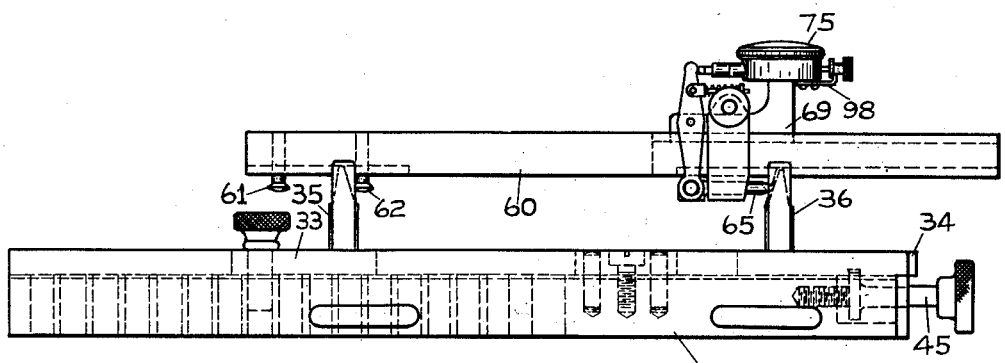
Figure 11:
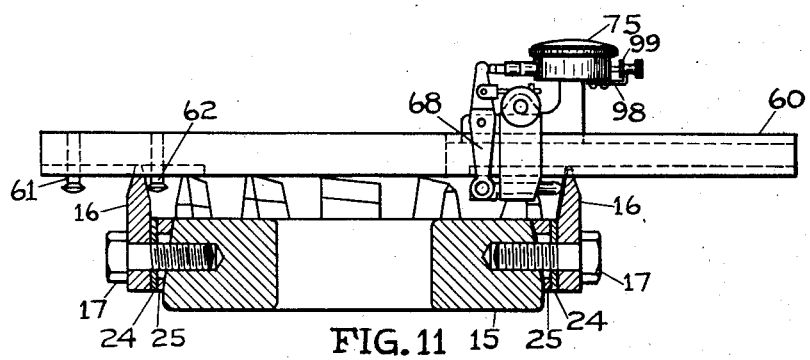
Figure 12:
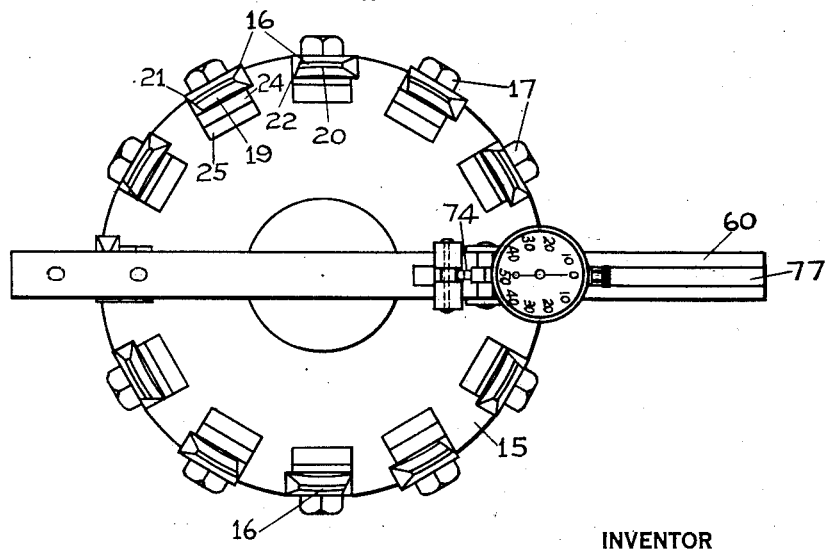

The invention is illustrated in connection with a preferred embodiment thereof in the accompanying drawings, in which:

Figure 1 is a plan view and Figure 2 a side elevation, respectively, of the master gauge forming one element of the testing apparatus;

Figures 3, 4 and 5 are sections on the lines 3—3, 4—4 and 5—5, respectively, of Figure 1 looking in the direction of the respective arrows;

Figure 6 is a side elevation of the test bar forming the other element of the present testing apparatus;

Figures 7, 8 and 9 are sectional views on an enlarged scale taken along the lines 7—7, 8—8 and 9—9 respectively, of Figure 6 looking in the direction of the respective arrows;

Figure 10 is a side elevation showing how the test bar is applied to the master gauge for the purpose of zeroizing the test bar; and Figures 11 and 12 are views showing how the previously zeroized test bar is employed to test the diameter of a face mill cutter, Figure 11 showing the test bar in side elevation and the cutter in section and Figure 12 showing both in plan.

Face mill cutters for gears are made in different diameters for cutting gears having teeth of different lengthwise curvature, in different cutter numbers to secure the desired pressure angles on the side tooth surfaces of the gears and in different point widths to cut gears of different pitches. Heretofore it has been required to use separate gauges for testing the diameters of different cutters. With the present invention, an adjustable master gauge and an adjustable test gauge or bar are provided. The master gauge includes a pair of master members or blades which can be adjusted relative to each other to space their side faces apart a distance corresponding to the theoretically correct distance between the corresponding side faces of diametrically opposed blades of the cutter to be tested, regardless of the diameter, cutter number or point width of such cutter. The test bar includes a pair of contact members, one of which is movable, and an indicating device which is adapted to cooperate with the movable contact member.

With the master gauge adjusted according to the theoretically correct inside or outside diameter of the cutter to be tested, the test bar is applied to the master gauge so that its contact members engage the proper side faces of the master members or blades, and the indicating device is then zeroized. The test bar is then taken off the master gauge and applied to the cutter in such way that its contact members engage the desired corresponding side faces of diametrically opposed blades of the cutter. The reading on the indicator indicates then, the error, if any, in the cutter diameter from theoretically correct diameter. If the test is being made after relieving a face mill cutter and an error in diameter is shown by the indicator of the test bar, it is usually preferred to put the cutter back on the relieving grinder and regrind the cutter to the correct diameter, as it is preferable to fix the position of two blades of a face mill cutter, one inside and one outside blade, and adjust the other blades with reference to these two. The cutter might be adjusted, however, to correct the error in diameter by adjusting its blades.

Figures 11 and 12 show one form of face mill gear cutter. This cutter comprises a head 15 and a plurality of removable blades 16 which project in the general direction of the axis of the head and are secured to the head by means of bolts 17. In the cutter shown, alternate blades 19 and 20 cut on opposite side tooth faces of a gear, the side cutting edges of these blades being indicated at 21 and 22, respectively.

Each of the blades of the cutter are relieved on both sides and on the top to provide the required clearance for the cutting edges. The blades are adjustable on the cutter heads 15 by means of shims 24 and wedges 25, to permit of making such slight changes in blade settings as are required when the cutter is sharpened and to also permit of changing the point widths of the cutters, which is the distance between the outside and inside cutting edges of the cutter measured at the tips of the blades.

Where gears are cut with teeth of different spiral angles and tapering in depth, if it be desired to have teeth of the same pressure angle on the various gears, it will be necessary to use cutters of different numbers unless a suitable adjustment be provided on the cutting machine. In the Gleason system, which is the universally used system, the number of the face mill cutter signifies the amount that the pressure angles of the opposite side cutting edges of the blades differ from the specified pressure angle, namely, from the pressure angle to be produced upon the teeth of the gear to be cut. In the Gleason system, the departure from the specified pressure angle increases ten minutes for each cutter number. To illustrate, a cutter of 14½° pressure angle has an included angle of 29° between opposite side cutting edges of the blades; in a number zero cutter of 14½° pressure angle, the side cutting edges are symmetrical with reference to a median line perpendicular to the plane of the tips of the cutter, that is, opposite side cutting edges make angles of 14½°, respectively, with said median line; in a number 1 cutter, the departure is 10′, the inside blade makes an angle of 14° and 40′ with said median line and the outside blade makes an angle of 14° and 20′ with such line; in a number 2 cutter the departure is 20′ and so on. This change in pressure angle of the cutting edges with different cutter numbers means, of course, that though a cutter be classified as of a certain mean cutter diameter, actually the diameter of the cutter measured between diametrically opposed outside cutting edges or diametrically opposed inside cutting edges will change with the cutter number.

Within the range of the master gauge and test bar, all diameters of cutters, whether they differ in mean diameter or in point width or in cutter number, can be measured by the use of one master gauge and one test bar constructed according to this invention.

One embodiment of master gauge is clearly shown in Figures 1 to 5 inclusive. 30 designates the base of this master gauge. The base 30 is formed with a pair of aligned dove-tailed slots 31 and 32 which extend longitudinally of the base and open upon its upper face. These slots 31 and 32 form guide ways for the carriers 33 and 34 which are slidably adjustable toward and from each other on the base. These carriers 33 and 34 form the supports for a pair of master gauge members 35 and 36 which may take the form, as shown, of a pair of diametrically opposed blades of a face mill cutter that are made integral with the carriers 33 and 34.

The base 30 of the master gauge is recessed between the slots 31 and 32 as indicated at 38. Secured to the base 30 within the recess 38 is a block 40. This block is secured to the base by the screw 41 and the dowel pins 42 and 43.

The master blade carrier or slide 34 can be adjusted on the base 30 by means of the screw 45 which threads into the base 30 and is provided with a collar 46 that enters a groove or recess formed in the bottom of the carrier 34. The screw 45 has a knurled outer end 47 and may be readily rotated by hand. The carrier 34 can be locked in any adjusted position by the wedge member 48 which is forced against one side of the carrier by the screw 49.

The carrier or slide 33 is adjusted by hand on the base 30 and is secured in any adjusted position by means of a pin 50 which slides through a hole formed in the carrier 33 and is adapted to enter selectively one of a series of equi-spaced apertures 52 formed in the base 30.

The construction of the test bar or gauge is illustrated in Figures 6 to 9 inclusive. This comprises the bar 60 proper and a set of contact points for engaging the side faces of the master blades 35 and 36 of the master gauge or the corresponding side faces of diametrically opposed blades of a face mill cutter. 61 and 62 designate, respectively, contact points which are fixed in the bar 60 and which are adapted to engage, respectively, opposite side faces of a master blade or opposite side cutting edges of a cutter. The contact members 61 and 62 are positioned diagonally in the bar 60 in such way that the points on their heads 63 and 64, which contact with master blade or the cutting edge of a cutting blade, lie in a median plane of the bar 60.

The pins 61 and 62 are preferably oppositely inclined in the bar 60.

65 designates a movable contact pin. This pin 65 is pivotally connected at one end, as by means of a pin 67, with a bi-furcated lever 68. The lever 68 is pivotally mounted on a slide 69 which is adjustable on the bar 60, the lever 68 being held on the slide 69 by the pivot pin 70.

The bi-furcated lever 68 straddles the bar 60 and the slide 69 and is formed on its upper side with a central arm 72. The arm 72 is provided with a rounded contact point 73 at its upper end which is adapted to engage the plunger 74 of a dial indicator 75 which is secured on the slide 69. The dial indicator may be of any usual or suitable type. In fact, instead of such an indicator any usual or suitable indicating means may be employed.

With one of the contact pins 61 or 62 in engagement with one of the side faces of a master blade 35 or 36 or in engagement with one of the side faces of a blade of a face mill cutter, the movable contact pin 65 is adapted to be positioned so that its tip will engage the corresponding face of the other master blade 35 or 36 as the case may be, or the corresponding face of a diametrically opposed blade of the cutter. To bring the contact pin 65 into engagement with a master blade or a blade of the cutter, the slide 69 is adjusted on the bar 60. The bar 60 is formed with a rectangular groove 77 in its upper face extending longitudinally of the bar and the slide 69 is formed with a rectangular tongue 78 which enters this groove 77 and serves to guide the slide 69 in its adjustment on the bar 60.

A coil spring 80 serves to hold the contact pin 65 in engagement with a master blade or a blade of the cutter as the case may be. This spring 80 surrounds a pin 81 which is formed integral with a U-clip 82 that is pivoted by means of the pin 83 to the arm 72 of the lever 68. The pin 81 slides at its free end in a lug 84 which is integral with the slide 69 and extends upwardly therefrom.

The slide 69 can be secured in any adjusted position on the bar 60 by means of a screw 85 which is adapted to pull together the free ends of a U-clamp 86 which straddles the bar 60 and the slide 69. The pin 65 is free to slide through a hole formed in this U-clamp 86.

In use, the master blades 35 and 36 of the master gauge are adjusted a distance apart determined by the theoretical distance between corresponding side faces of a pair of diametrically opposed blades of the face mill cutter to be tested. This distance will vary, of course, for a cutter of a selected mean diameter and pressure angle, with the point width of the blades of the cutter and the cutter number.

With the master blades adjusted, the test bar 60 is applied to the master gauge so that the appropriate contact points of the test bar engage the inside or the outside faces of the master blades depending upon whether the inside or outside diameter of the cutter is to be tested. Secured to the master blades 35 and 36 are pairs of straps 100 and 101, respectively. These extend beyond the tips of the master blades, and serve to locate the bar 60 on the master gauge. For testing the inside diameter of a cutter, the contact pin 62 is engaged with the inside face of one of the master blades 35 or 36 and the contact pin 65 is moved into engagement with the inside face of the other master blade by moving the slide 69 on the bar 60. The slide 69 is then locked in position by means of the clamp 86 and screw 85 and the indicator dial 75 is then adjusted to zero. The slide 69 is made so that it can be slid off the bar 60 and reversed and slid back on the bar 60 so that the pin 65 can be brought into contact with either the inside or the outside face of a master blade. For testing the outside diameter of a cutter, the contact pin 61 is engaged with the outside face of one master blade, the contact pin 65 is moved into engagement with the outside face of the other master blade, the slide 69 is locked and the dial 75 is set to zero.

With the test bar zeroized, it is taken off the master gauge and applied to the cutter so that the contact point 62 and the contact point 65 or the contact point 61 and the contact point 65, as the case may be, engage the inside faces or the outside faces of diametrically opposed blades of the cutter. If there is any error in the cutter diameter, it will be read then on the indicator 75.

As stated above, the outside or inside diameters of face mill cutters vary, for a given mean diameter and pressure angle, with the point width of the blades and the cutter number. In practice in adjusting the master gauge for measuring various cutters, the slide 33 is set roughly by means of the apertures 52 and the pin 50 and the fine adjustments required to space the master blades 35 and 36 the correct distance apart are made with the screw 45 which operates the slide 34. The position of the slide 34 is determined by plug gauges, one of which is shown at 90 in Figures 1, 2 and 4. The plug gauge is set up against the block 40 and the slide 34 adjusted toward the slide 33 until it contacts the plug gauge. Thus the position of the slide 34 can be very accurately adjusted.

For setting his master gauge, the operator can consult a table which shows the required settings of the slide 33 and the slide 34 for cutters of different point widths, different pressure angles, different mean diameters and different cutter numbers. The table will look somewhat as follows:

*Mean cutter diameter 9″—pressure angle 14½°*

Cutter number 5½

| Inside blades | | Outside blades | |
|---|---|---|---|
| Point width | Slide setting | Plug No. | Slide setting | Plug No. |
| .060″ | 9 | 174 | 8.5 | 304 |
| .100″ | 9 | 134 | 8.5 | 344 |
| .130″ | 9 | 104 | 8.5 | 374 |

Cutter number 7½

| .060″ | 9 | 170 | 8.5 | 302 |
| .100″ | 9 | 130 | 8.5 | 342 |
| .130″ | 9 | 100 | 8.5 | 372 |

For other mean cutter diameters, pressure angles, cutter numbers and point widths other tables will be furnished.

The plug gauges used are the precisionized gauges in use in all machines shops. These gauges differ in diameter by predetermined increments. In practice, changes in setting of the master blades 35 and 36 up to say one-half an inch will be made by using plug gauges of different sizes to set the slide 34. Changes amounting to half an inch can then be made with the slide 33.

To illustrate the use of a master gauge, let it be assumed that it is desired to test the inside diameter of a face mill cutter which has a mean diameter of 9″, the blades of which are of 14½° mean pressure angle, which has a .100″ point width and is a number 5½ cutter. The operator consults his table and finds that he must set the slide 33 so that the zero mark on this slide reads opposite the mark 9 on the base 30 of the master gauge and that he must use a number 134 plug gauge. He sets the master gauge accordingly, by fixing the slide 33 in correct position by the pin 50 and by moving the slide 34 to abut the number 134 plug gauge which he places in abutment with the block 40. For the outside diameter of the same cutter, the slide 33 is set at 8.5 and a number 344 plug gauge is used.

With the master blades adjusted the correct distance apart, as described, the slide 32 can be locked in its adjusted position by the taper wedge 48 and the screw 49. The plug gauge can then be removed. The test bar is then applied to the master gauge as shown in Figure 10. This figure shows the test bar adjusted for measuring the inside diameter of a cutter. The contact member 62 is in engagement with the inside face of the adjusted master blade 35 and the contact pin 65 has been adjusted by sliding the slide 69 on the bar 60 so that it contacts with the inside face of the adjusted master blade 36.

The dial indicator 75 is then adjusted so that it reads zero.

With the test bar zeroized, it is applied to the cutter to be tested. Figures 11 and 12 show the test bar, which has been zeroized as shown in Figure 10, in position on the cutter for testing the inside diameter thereof.

As previously indicated, in a face mill cutter having alternate inside and outside cutting blades, one of the inside and one of the outside blades are usually fixed in position, although the other blades remain adjustable. For testing the cutter, the test bar is applied to the cutter so that the contact point 61 or 62, as the case may be, contacts the cutting edge of one of these fixed blades of the cutter head and the point 65 contacts with the diametrically opposed adjustable blade of the cutter head. If there is any error in the diameter of the cutter, it will be read instantaneously on the indicator dial 75. The cutter can then be returned to the machine, proper corrections in the machine adjustments made and the cutter reground to secure the proper diameter.

The setting of the indicator to zero by the master gauge is, of course, a matter of convenience. The operator might instead note the indicator reading when the test bar is applied to the master gauge and the difference between that reading and the reading of the indicator when applied to the cutter would give him the cutter diameter error. The term "zeroizing" as used in the specification and claims is not to be understood then as applying simply when the indicator is actually set to zero but is intended to cover as well the operation in which the indicator reading only is noted.

Finish cutting blades are usually ground in their heads. To suit the relief angle on the blade, the test bar 60 used for testing finishing cutters is beveled off in opposite directions at the two ends of the bar as indicated at 95 and 96 in Figures 6 to 9 inclusive so that the bar can rest correctly upon the blades of the cutter or upon the master blades of the master gauge.

Roughing face mill cutter blades are usually relief ground in a head which is formed with inclined slots to receive the roughing blades and for testing roughing cutter blades after relief grinding, the test bar can have a flat bottom surface.

To prevent any possible error in reading the indicator, an L-shaped clip 98 (Fig. 6) is secured to the bottom of the indicator casing. The turned-up portion of this clip extends between the collar 99 and the knurled tip of the indicator plunger thereby permitting only a limited movement of the plunger. The distance between the collar 99 and the knurled tip of the plunger is such that the clip 98 prevents the indicator pointer from making more than one complete revolution.

The test apparatus of the present invention may be employed for testing the diameters of face mill cutters at any time though, of course, it is most useful for testing the cutters after the relief grinding operation, as described.

While the invention has been described in connection with a particular embodiment and in connection with the testing of a particular form of face mill cutter, it will be understood that the invention is capable of various further modifications, adaptations, and uses and that this application is intended to cover any variations, uses, or adaptations of the invention, following, in general, the principles of the invention and including such departures from the present disclosure as may come within known or customary practice in the art to which it pertains and as may be applied to the essential features hereinbefore set forth and as fall within the limits of the invention or the scope of the appended claims.

Having thus described my invention, what I claim is:

1. As an article of manufacture, a master gauge designed for setting gauges used in testing the diameters of face mill gear cutters comprising a base, movable members mounted on said base for adjustment toward and from one another, a pair of master blades mounted, respectively, on said movable members and extending, respectively, outwardly therefrom, said master blades having their side faces inclined to each other and their tip surfaces inclined in opposite directions, and a fixed member mounted on the base between the movable members to cooperate selectively with one of a series of precisionized gauges for adjusting one of said movable members on the base and means for adjusting the other movable member on the base to permit setting corresponding side faces of the blades a distance apart determined by the theoretically correct distance between corresponding side faces of diametrically opposed blades of a face mill cutter to be tested.

2. As an article of manufacture, a master gauge designed for setting gauges used in testing the diameters of face mill gear cutters comprising a base, a pair of slides adjustable on the base toward and from each other, a master blade secured to each slide and extending outwardly therefrom, means for adjusting one of the slides on the base, a fixed member secured to the base between said slides to cooperate with one of a series of precisionized gauges, the sizes of which increase in predetermined increments over one another through distances which are fractional parts of the unit distance of adjustment of the first slide for adjusting the two slides to position corresponding side faces of the blades a distance apart determined by the theoretical distance between corresponding side faces of diametrically opposed blades of the cutter to be tested.

3. As an article of manufacture, a master gauge designed for setting gauges used in the testing of face mill gear cutters comprising a base having a pair of aligned slots formed therein, a pair of slides adjustable in said slots toward and from each other, a block secured to the base between the two slots, said block being arranged to cooperate selectively with one of a series of precisionized gauges for use in adjusting one of said slides through definite unit distances, means for adjusting the other slide through unit distances of which the units of adjustment of the first slide are fractional parts, and a master blade secured to each of said slides and extending outwardly therefrom.

SCHUYLER H. EARL.